United States Patent
Kawamura

(10) Patent No.: US 6,932,467 B2
(45) Date of Patent: Aug. 23, 2005

(54) INK-JET RECORDING METHOD AND APPARATUS

(75) Inventor: Hidetaka Kawamura, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 5 days.

(21) Appl. No.: 10/606,212

(22) Filed: Jun. 26, 2003

(65) Prior Publication Data

US 2004/0017450 A1 Jan. 29, 2004

(30) Foreign Application Priority Data

Jun. 28, 2002 (JP) ........................................ 2002-189397

(51) Int. Cl.$^7$ ................................................ B41J 2/01
(52) U.S. Cl. .................... 347/100; 347/95; 106/31.6
(58) Field of Search ............................. 347/100, 96, 95, 347/101; 106/31.6, 31.27, 31.13; 523/160

(56) References Cited

U.S. PATENT DOCUMENTS 6,299,675 B1 * 10/2001 Ono et al. .................. 347/100
6,440,203 B2 * 8/2002 Kato .......................... 106/31.6
6,536,891 B2 * 3/2003 Oyanagi ..................... 347/100

FOREIGN PATENT DOCUMENTS

JP          56-147871 A      11/1981

OTHER PUBLICATIONS

V. Bonačić–Koutecký, et al., *Journal of the American Chemical Society*, vol. 105, 1983, pp. 3388–3395.

* cited by examiner

Primary Examiner—Manish S. Shah
(74) Attorney, Agent, or Firm—Fitzpatrick, Cella, Harper & Scinto

(57) ABSTRACT

Disclosed herein is an ink-jet recording method including using pigment inks of plural colors and ejecting the inks to form colored pixels on a recording medium to conduct recording, wherein with respect to at least one color of the plural colors, a thick pigment ink containing a pigment at a relatively high concentration and a thin pigment ink containing the pigment at a relatively low concentration are used, and the average particle diameter of pigment particles contained in the thin pigment ink is greater than the average particle diameter of pigment particles contained in the thick pigment ink.

8 Claims, 4 Drawing Sheets

INK-JET RECORDING METHOD AND APPARATUS

BACKGROUND OF THE INVENTION

1. Field of the Invention

The present invention relates to an on-demand type ink-jet recording method and apparatus in which a black pigment ink and a thick color pigment ink as well as another thin color pigment ink having the same hue are ejected according to printing data to form colored pixels on a recording medium, thereby conducting recording.

2. Related Background Art

An ink-jet recording system is a system in which a single color ink or inks of plural colors corresponding to color recording are ejected on a recording medium (paper, cloth, OHP paper, printed circuit board or the like), thereby forming an image. An ink-jet recording apparatus, to which this system is applied, is equipped with a carriage on which a recording head and an ink tank are mounted, a conveyance part for conveying a recording medium and a control part for controlling them.

In such an ink-jet recording apparatus, ink droplets are ejected from a plurality of ink-jet recording nozzles (hereinafter referred to as "nozzles" merely) while serially scanning the recording head in a direction (main scanning direction) perpendicular to a conveying direction (sub scanning direction) of the recording medium. On the other hand, the recording medium is intermittently conveyed by a quantity equal to a recording width while recording operation is not carried out, thereby successively conducting recording on the recording medium. This recording system has already been widely used as a high-speed, simple and cheap recording system because an ink is directly ejected on the recording medium according to recording signals to conduct recording. In addition, its bright future is expected because it has such a merit that recording can also be conducted on plain paper.

Besides, recording heads for plural colors are provided, whereby such apparatus can easily cope with the formation of a full-color image or high-quality image, so-called photo-image. In the case of such an ink-jet recording apparatus, six recording heads and ink tanks corresponding to six colors in total of black (B), yellow (Y), thick magenta (M) and thick cyan (C) as well as photo-magenta (PM; thin magenta) and photo-cyan (PC; thin cyan) are generally used.

Incidentally, in the conventional ink-jet recording apparatus, those obtained by dissolving various kinds of water-soluble dyes in water or a mixture of water and an organic solvent are used as inks. When the water-soluble dyes are used, however, a problem often arises on light fastness of the resulting recorded image because these water-soluble dyes are naturally poor in light fastness.

The fading phenomenon of ink is known to be caused by photolysis or peroxidation of a color molecule contained in the ink. An oxygen molecule is considered to accelerate the photochemical reaction in the presence of oxygen. This reaction takes place through stages represented by the following formulae (1) to (4) (set forth in P. Douglas, M. Towsend and R. Persico, J. Am. Chem. Soc., 105, 3388 (1983), and the like).

$$^1DYE \xrightarrow{h\nu} {}^1DYE^* \text{ (Excitation of color molecule)} \quad (1)$$

$$^1DYE^* \rightarrow {}^3DYE^* \text{ (Intersystem crossing)} \quad (2)$$

$$^3DYE^* + {}^3O_2 \rightarrow {}^1DYE + {}^1O_2^* \quad (3)$$

(Excitation of oxygen molecule by color molecule)

$$^1DYE + {}^1O_2^* \rightarrow \text{Photolysis or peroxidation} \quad (4)$$

wherein "DYE" denotes a dye, "¹" and "³" respectively represent a singlet and triplet states, and "*" means an excitation state.

Accordingly, when the color molecule is isolated from the oxygen molecule as much as possible, the photolysis or peroxidation of the color molecule is avoided, so that the ink is expected to improve the light fastness.

For example, a pigment with color molecules aggregated is low in proportion coming into contact with oxygen molecules and relatively high in light fastness, so that many ink-jet recording apparatus making use of pigments have been proposed in recent years. For example, Japanese Patent Application Laid-Open No. 56-147871 has proposed water-based pigment inks with a pigment dispersed with a polymeric dispersing agent.

However, the pigment-containing ink, i.e. a pigment ink, has a possibility that the pigment may precipitate on the bottom of an ink tank during long-term storage, or record density may vary according to changes in the concentration of the ink. In addition, there have been fears that clogging would occur in an ink flow path or within nozzles to cause ejection failure of the ink, or in the case of a thermal ink-jet recording apparatus in which thermal energy is used to form a bubble in an ink, and the ink is ejected on the basis of the formation of the bubble, inconveniences such as kogation would occur during ejection of the ink.

In such thin inks of photo-magenta, photo-cyan, etc. as described above, there has been a fear of markedly deteriorating light fastness though their shelf stability is excellent.

SUMMARY OF THE INVENTION

The present invention has been made in view of the foregoing problems and has as its object the provision of ink-jet recording method and apparatus, which can not only form color images having high light fastness, but also prevent the occurrence of inconveniences such as variations of record density after long-term storage, ejection failure of ink and kogation.

The above object can be achieved by the present invention described below.

According to the present invention, there is thus provided an ink-jet recording method comprising the steps of preparing pigment inks of plural colors and ejecting the inks to form colored pixels on a recording medium to conduct recording, wherein with respect to at least one color of the plural colors, a thick pigment ink containing a pigment at a relatively high concentration and a thin pigment ink containing the pigment at a relatively low concentration are used, and the average particle diameter of pigment particles contained in the thin pigment ink is greater than the average particle diameter of pigment particles contained in the thick pigment ink.

According to the present invention, there is also provided an ink-jet recording apparatus comprising a plurality of ink-jet recording heads for respectively ejecting pigment inks of plural colors to form colored pixels on a recording medium to conduct recording, wherein with respect to at least one color of the plural colors, an ink-jet recording head for ejecting a thick pigment ink containing a pigment at a relatively high concentration and an ink-jet recording head for ejecting a thin pigment ink containing the pigment at a relatively low concentration are provided, and the average particle diameter of pigment particles contained in the thin pigment ink is greater than the average particle diameter of pigment particles contained in the thick pigment ink.

DETAILED DESCRIPTION OF THE INVENTION

Figure 1:
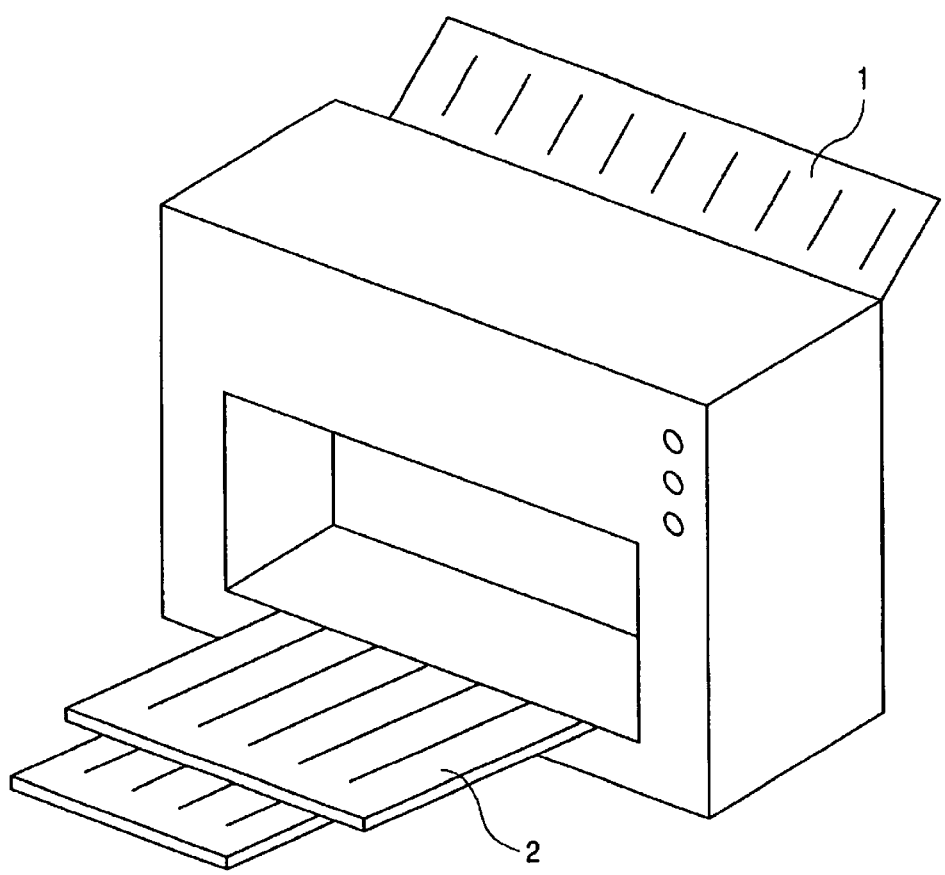
FIG. 1 is a perspective view illustrating an exemplary recording apparatus according to the present invention.

The present inventor has carried out an extensive investigation as to the technical problems and inferred that the cause thereof resides in the concentration and particle diameter of a pigment used.

More specifically, in a pigment ink of a high concentration, the pigment tends to associate because the number of collision between pigment particles increases. Further, since surface area to volume of particles is small in an ink containing pigment particles having a great particle diameter, repulsive force between the particles is little, and so the pigment tends to associate. As a result, various problems such as precipitation and clogging are easier to arise.

In an ink of a low concentration on the other hand, association between pigment particles is little because the concentration of the particles is thin. Therefore, the particle diameter of the pigment particles is hard to become great, and good shelf stability is achieved. Since the pigment particles in such an ink are ejected particularly thinly on a recording medium, however, a proportion coming into contact with an oxygen molecule on the recording medium increases, so that the light fastness of the resulting image is easy to be deteriorated.

The present inventor found out the above-described present invention in which the relationship between the concentrations of the inks and the particle diameters of pigments is made appropriate, and thus being able to achieve the marked effects.

In the present invention, a color used in the thick pigment ink and thin pigment ink is preferably magenta and/or cyan. At this time, the thick pigment ink may be provided as a thick magenta ink and/or a thick cyan ink, and the thin pigment ink may be provided as a thin magenta ink and/or a thin cyan ink correspondingly.

The average particle diameter of the pigment contained in the thin pigment ink is preferably not smaller than 100 nm, but smaller than 500 nm, particularly preferably not smaller than 100 nm, but smaller than 200 nm. The average particle diameter of the pigment contained in the thick pigment ink is preferably not smaller than 50 nm, but smaller than 100 nm, particularly preferably not smaller than 50 nm, but smaller than 75 nm.

The average particle diameter in the present invention is a number average particle diameter and can be determined by an appropriate measuring device such as ELS 800 Laser Zeta Potential Meter (trade name, manufactured by Otsuka Denshi K.K.).

In the present invention, it is also preferable that bubbles be formed in the inks using thermal energy by a heater, and the inks be ejected by a pressure generated by the formation of the bubbles.

An embodiment of the ink-jet recording apparatus according to the present invention will hereinafter be described in detail with reference to the drawings. However, the present invention is not limited thereto, and each component may be replaced by any substitute so far as the object of the present invention is achieved.

The ink-jet recording apparatus illustrated herein is of the on-demand type ink-jet recording apparatus equipped with scanning means for scanning ink-jet recording heads in the direction perpendicular to a conveying direction of a recording medium, in which a plurality of ink-jet recording nozzles are provided for each color in series in the conveying direction of the recording medium, wherein a black pigment ink and a thick color pigment ink as well as a thin color pigment ink having the same hue are ejected to form colored pixels on the recording medium to conduct recording, and the average particle diameter of pigment particles contained in the thin pigment ink is greater than the average particle diameter of pigment particles contained in the thick pigment ink having the same hue.

FIG. 1 is a perspective view illustrating an exemplary ink-jet recording apparatus according to the present invention. One of recording media set in a paper feed tray 1 is conveyed downward with the beginning of a printing job and discharged to a discharge tray 2 after an ink image is formed thereon by an ink-jet recording head (not illustrated).

Figure 2:
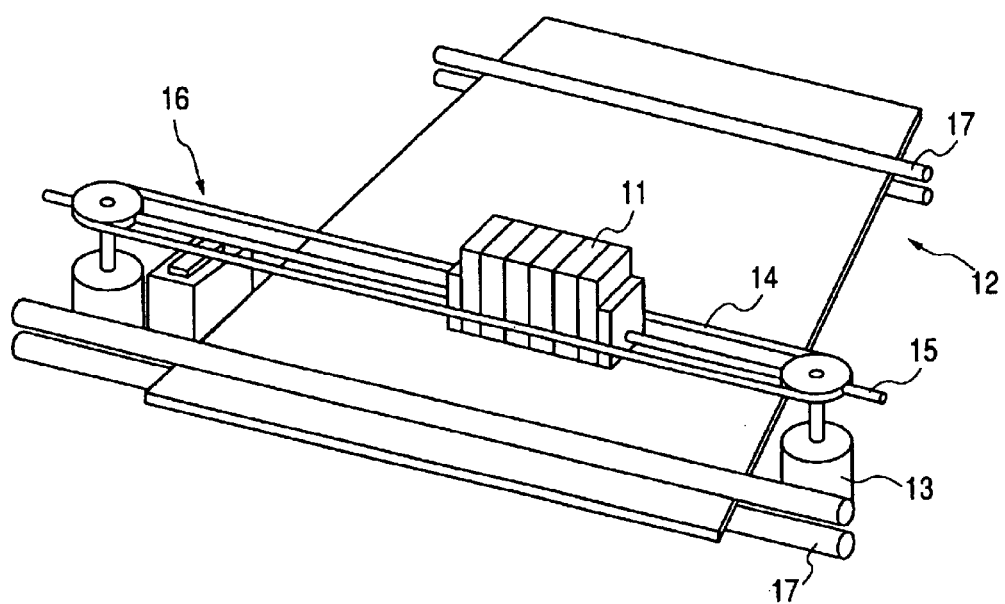
FIG. 2 is an enlarged view illustrating principal parts of the exemplary recording apparatus according to the present invention.

FIG. 2 is a perspective view illustrating principal parts of the ink-jet recording apparatus according to this embodiment of the present invention. A carriage 11 is moved perpendicularly to a conveying direction of a recording medium 12 along a carriage-driving rail 15 through a carriage-driving belt 14 by a carriage-driving motor 13. The recording medium 12 is conveyed by carrying rollers 17 driven by a paper-carrying motor (not illustrated), and the operation of the paper-carrying motor and the carriage-driving motor 13 is controlled by a control circuit (not illustrated) An ejection-recovery portion 16 is equipped with an ejection-recovery pump (not illustrated), and an ink can be sucked by the recovery pump when an ink-jet recording head is brought into contact therewith.

Figure 3:
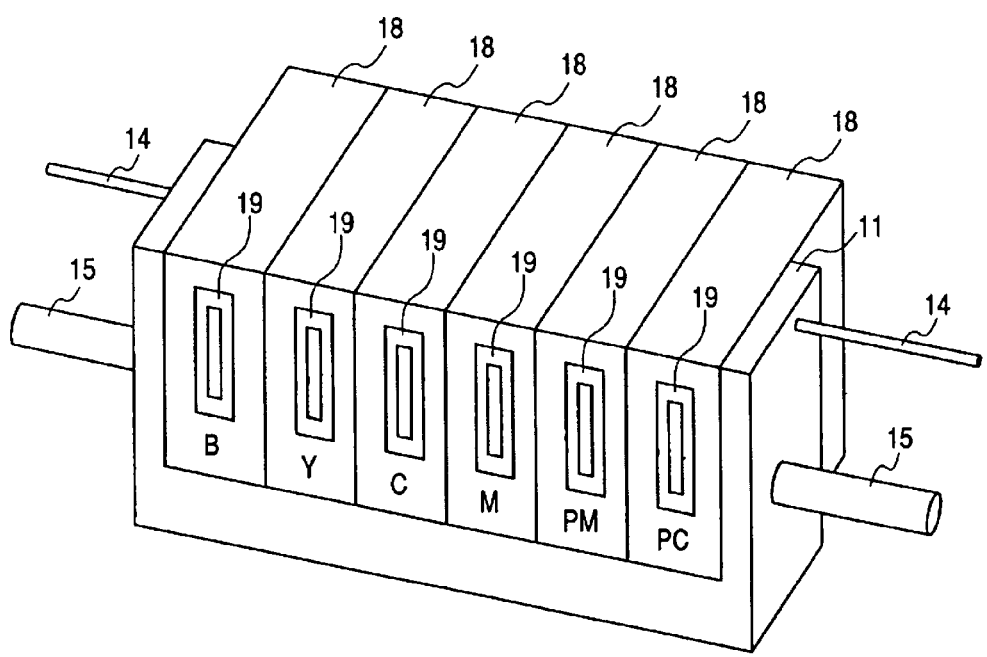
FIG. 3 is a perspective view illustrating the construction of a carriage in the exemplary recording apparatus according to the present invention.

FIG. 3 is an enlarged view of a carriage portion in this embodiment viewed from a direction of the recording medium. Six inks of black (B), yellow (Y), magenta (M), and cyan (C) as well as photo-magenta and photo-cyan that are the same hues as the magenta and cyan, respectively, but thinner in pigment concentration than these colors, are used, and an ink-jet recording head 18 is provided for each ink. Ink droplets are ejected from nozzles 19 provided on the ink-jet recording head 18, and Sixty-four nozzles are provided for each ink.

No particular limitation is imposed on the compositions of the pigment inks used in the present invention and a preparation method thereof except that the average particle diameter of pigment particles contained in the thin pigment ink is greater than the average particle diameter of pigment particles contained in the thick pigment ink, and any publicly known techniques may be applied.

No particular limitation is imposed on the pigment concentration in the pigment ink. In the case of the thick pigment ink, however, it is preferably at most 10% by mass, particularly preferably at most 5% by mass, based on the whole mass of the ink. In the case of the thin pigment ink, the concentration is preferably, for example, at most $\frac{1}{4}$ of the pigment concentration in the thick pigment ink, particularly preferably from $\frac{1}{6}$ to $\frac{1}{4}$, most preferably about $\frac{1}{4}$.

No particular limitation is imposed on the kinds of pigments usable in the present invention, and for example, the following pigments may be used.

As pigments for the black ink, may be used carbon black produced by the furnace process or channel process, and commercially available products such as No. 2300, No. 900, MCF 88, No. 33, No. 40, No. 45, No. 52, MA 7, MA 8 and No. 2200B (all, products of Mitsubishi Chemical Industries Limited), RAVEN 1255 (product of Columbian Carbon Co.), REGAL 400R, REGAL 330R, REGAL 660R, MOGUL L (all, products of Cabot Co.), Color Black FW1, Color Black FW18, Color Black S170, Color Black S150, Printex 35 and Printex U (all, products of Degussa Co.) may be used.

Commercially available products such as C.I. Pigment Yellow 1, C.I. Pigment Yellow 2, Pigment Yellow 3, C.I. Pigment Yellow 13, C.I. Pigment Yellow 16, C.I. Pigment Yellow 74 and C.I. Pigment Yellow 83 may be used for the yellow ink.

Commercially available products such as C.I. Pigment Red 5, C.I. Pigment Red 7, C.I. Pigment Red 12, C.I. Pigment Red 48(Ca), C.I. Pigment Red-48(Mn), C.I. Pigment Red 57(Ca), C.I. Pigment Red 112 and C.I. Pigment Red 122 may be used for the high-concentration/low-concentration magenta inks. However, different kinds of pigments may also be used for the high-concentration/low-concentration inks.

Commercially available products such as C.I. Pigment Blue 1, C.I. Pigment Blue 2, C.I. Pigment Blue 3, C.I. Pigment Blue 15:3, C.I. Pigment Blue 16, C.I. Pigment Blue 22, C.I. Vat Blue 4 and C.I. Vat Blue 6122 may be used for the high-concentration/low-concentration cyan inks. However, different kinds of pigments may also be used for the high-concentration/low-concentration inks.

These pigments may be subjected to a surface treatment or the like for the purpose of improving wettability of the pigments.

No particular limitation is imposed on an alkali-soluble resin so far as it is a resin soluble in an aqueous solution with a basic substance dissolved therein. However, it is preferably an alkali-soluble resin usable as a dispersing agent for the pigments and having a weight average molecular weight of from 100 to 20,000, particularly from 2,000 to 15,000. Specific examples thereof include block copolymers, graft copolymers and random copolymers composed of at least two monomers selected from styrene, styrene derivatives, vinylnaphthalene derivatives, aliphatic alcohol esters of α,β-ethylenically unsaturated carboxylic acids, acrylic acid, acrylic acid derivatives, maleic acid, maleic acid derivatives, itaconic acid, itaconic acid derivatives, fumaric acid, fumaric acid derivatives, etc.

As the basic substance for solubilizing the alkali-soluble resin in water, may be used an alkanolamines such as monoethanolamine, diethanolamine, triethanolamine, ethylmonoethanolamine, ethyldiethanolamine, monoisopropanolamine, diisopropanolamine or triisopropanolamine, an organic amine such as ammonia, or an inorganic base such as potassium hydroxide or sodium hydroxide.

An aqueous medium suitable for use in the inks in the present invention is a mixed solvent composed of water and a water-soluble organic solvent. As for the water, it is preferable to use ion-exchanged water (deionized water) instead of tap water containing various ions.

Examples of the water-soluble organic solvent used in combination with water include alkyl alcohols having 1 to 4 carbon atoms, amides, ketones or ketone alcohols, ethers, polyalkylene glycols, alkylene glycols the alkylene moiety of which has 2 to 6 carbon atoms, and lower alkyl ethers of polyhydric alcohols.

Among a number of these water-soluble organic solvents, polyhydric alcohols such as diethylene glycol and lower alkyl ethers of polyhydric alcohols, such as triethylene glycol monomethyl (or monoethyl) ether are preferred.

In order to disperse the pigment, it is preferable to use a dispersing machine, and any dispersing machine which is generally used can be employed. As examples thereof, may be mentioned ball mills, roll mills, sand mills and sand grinders.

As for a method for providing a dispersion of a pigment having a desired particle size distribution, any publicly known technique may be applied.

Figure 4:
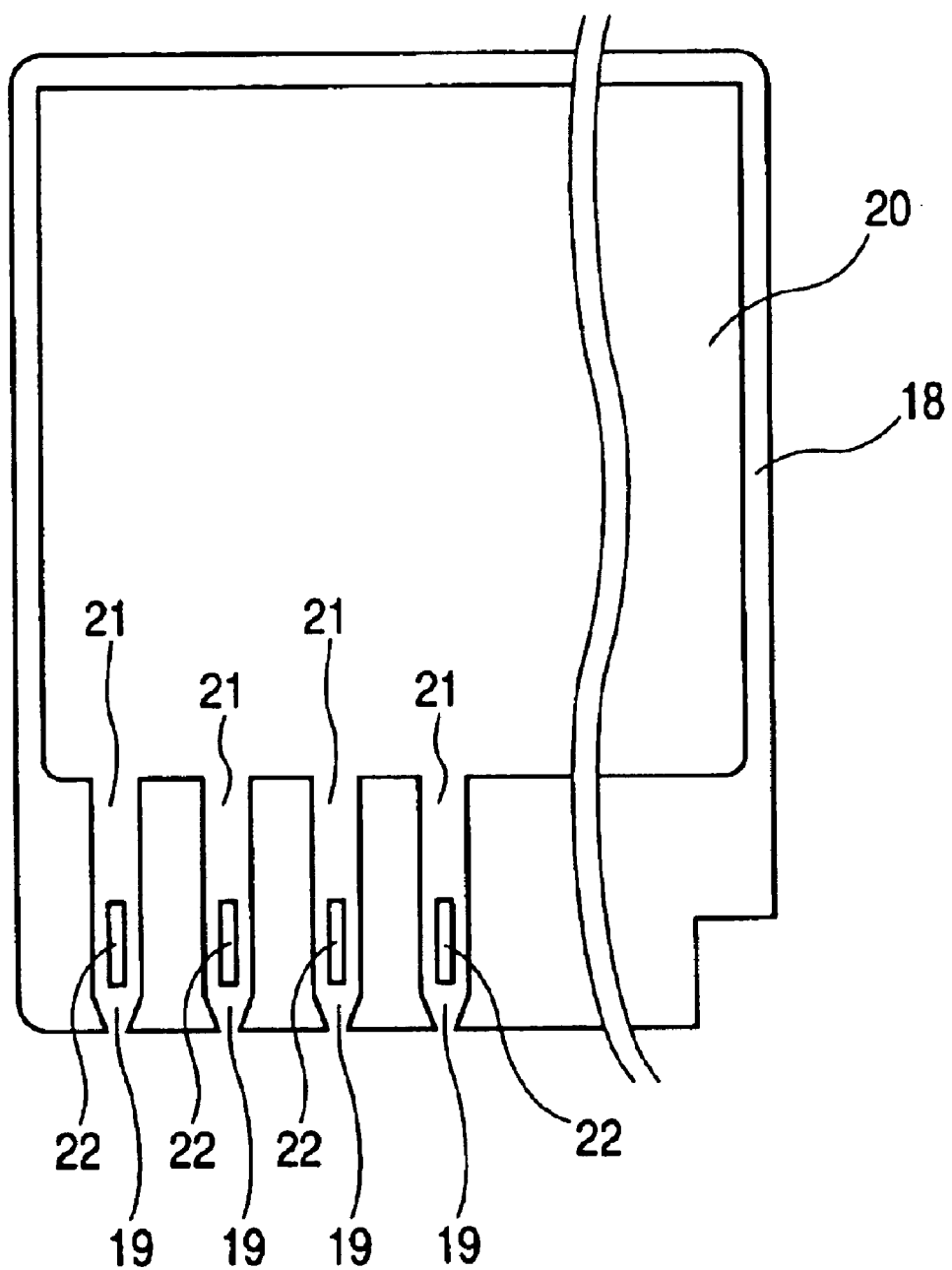
FIG. 4 is a cross-sectional view illustrating the construction of an ink-jet recording head of the exemplary recording apparatus according to the present invention.

FIG. 4 is a cross-sectional view of an exemplary ink-jet recording head 18 for explaining an ink tank. A common liquid chamber (ink tank) 20 is provided within the ink-jet recording head 18. An ink-absorbing member is preferably provided in the liquid chamber. Polyurethane is preferably used as a material for the ink-absorbing member. A pigment ink prepared is stored in this ink tank. In the ink tanks for black, yellow, thick magenta and thick cyan inks, inks of these colors containing a pigment having an average particle diameter of not smaller than 50 nm, but smaller than 100 nm are respectively provided. On the other hand, photo-magenta and photo-cyan inks containing a pigment having an average particle diameter of not smaller than 100 nm, but smaller than 500 nm are respectively provided in the ink tanks for photo-magenta and photo-cyan inks.

A bubble is generated by heat of a heater 22 provided in an ink flow path 21, and the ink is ejected from an ink-jet recording nozzle 19 by this bubble.

The present invention will hereinafter be described in more detail by the following EXAMPLE.

EXAMPLE 1

(Preparation of Pigment Dispersion for High-Concentration Pigment Ink)

| | |
|---|---|
| Alkali-soluble styrene-acrylic acid Copolymer (weight average molecular weight: 5000) | 50 parts |
| Monoethanolamine | 1.0 part |
| Ion-exchange water | 68.0 parts |
| Diethylene glycol | 5.0 parts. |

Incidentally, all designations of "part" or "parts" and "%" as will be used in the specification mean part or parts by mass and % by mass unless expressly noted.

The above-described components were mixed and heated to 70° C. in a water bath to completely dissolve the resin component therein. To the resultant solution, were added 20 parts of a pigment (Pigment Yellow 93) and 1.0 part of isopropyl alcohol to premix them for 30 minutes. Thereafter, the resultant premix was subjected to a dispersion treatment under the following conditions.

Dispersing machine: sand grinder
Grinding medium: zirconium beads (diameter: 1 mm)
Packing rate of grinding medium: 50% (by volume)
Grinding time: 3 hours.

The thus-ground mixture was further subjected to a centrifugal treatment (12,000 rpm, approx. 20 minutes) to remove coarse particles, thereby preparing a dispersion. The average particle diameter of the pigment was measured and found to be 93 nm. (Preparation of high-concentration pigment ink)

The ink was prepared in the following manner. Components described below were added to the dispersion for high-concentration pigment ink prepared above so as to give a prescribed concentration. The average particle diameter of the pigment in the resultant ink was 93 nm.

| | |
|---|---|
| Dispersion prepared above | 15 parts |
| Glycerol | 10 parts |
| Diethylene glycol | 15 parts |
| 30% aqueous solution of alkali-soluble resin (aqueous solution of styrene-acrylic acid copolymer; average molecular weight: 5,000; neutralized with monoethanolamine; neutralization rate: 110%) | 50 parts |
| Ion-exchanged water | 10 parts. |

(Preparation of Pigment Dispersion for Low-Concentration Photo Ink)

A pigment dispersion for low-concentration photo ink was prepared in the same manner as the pigment dispersion for high-concentration pigment ink was prepared except that the time for the centrifugal treatment was decreased to ten and several minutes. Then the average pigment particle diameter was measured and found to be 174 nm.

(Preparation of Low-Concentration Photo Ink)

The ink was prepared in the following manner. Components described below were added to the dispersion prepared above so as to give a prescribed concentration. The average particle diameter of the pigment in the resultant ink was 174 nm.

| | |
|---|---|
| Dispersion prepared above | 3 parts |
| Glycerol | 10 parts |
| Diethylene glycol | 15 parts |
| 30% aqueous solution of alkali-soluble resin (aqueous solution of styrene-acrylic acid copolymer; average molecular weight: 5,000; neutralized with monoethanolamine; neutralization rate: 110%) | 10 parts |
| Ion-exchanged water | 42 parts. |

Comparative Example 1

A high-concentration pigment ink was prepared in the same manner as in EXAMPLE 1 except that the dispersion condition was changed to control the average particle diameter of the pigment in the high-concentration pigment ink to 174 nm.

The thus-obtained high-concentration pigment ink in EXAMPLE 1 and the high-concentration pigment ink in COMPARATIVE EXAMPLE 1 were left to stand for long time, and after that the change in average pigment particle diameter was observed using ELS 800 Laser Zeta Potential Meter (trade name, manufactured by Otsuka Denshi K.K.).

TABLE 1

| | EXAMPLE 1 | COMP. EXAMPLE 1 |
|---|---|---|
| Initial particle diameter | 93 nm | 174 nm |
| Particle diameter after long-term storage | 182 nm (after 4-month storage) | 202 nm (after 1-month storage) |

As can be seen from the above result shown in Table 1, it is assumed that the pigment particles of COMPARATIVE EXAMPLE 1 having a larger average particle diameter has a relatively small surface area to the volume thereof to show weak repulsive force between the particles, so that association between the pigment particles is liable to take place. As a result the association between the pigment particles, which may cause various problems such as precipitation of the pigment and clogging within nozzles, has developed four times faster than the pigment particles of EXAMPLE 1.

As described above, according to the present invention the ink-jet recording method and apparatus can be provided which can not only form color images having high light fastness, but also hardly cause technical problem due to the high-concentration pigment ink and prevent the occurrence of inconveniences such as variations of record density after long-term storage, ejection failure of ink and kogation.

What is claimed is:

1. An ink-jet recording method comprising the steps of:
   preparing pigment inks of plural colors; and
   ejecting the inks to form colored pixels on a recording medium to conduct recording,
   wherein with respect to at least one color of the plural colors, a thick pigment ink containing a pigment at a relatively high concentration and a thin pigment ink containing the pigment at a relatively low concentration are used, and the average particle diameter of pigment particles contained in the thin pigment ink is greater than the average particle diameter of pigment particles contained in the thick pigment ink.

2. The ink-jet recording method according to claim 1, wherein the average particle diameter of the pigment contained in the thin pigment ink is not smaller than 100 nm, but smaller than 500 nm.

3. The ink-jet recording method according to claim 2, wherein the average particle diameter of the pigment contained in the thick pigment ink is not smaller than 50 nm, but smaller than 100 nm.

4. The ink-jet recording method according to claim 1, wherein said ink ejecting step includes forming bubbles in the inks using thermal energy to eject the inks by a pressure generated by the formation of the bubbles.

5. An ink-jet recording apparatus comprising:
   a plurality of ink-jet recording heads for respectively ejecting pigment inks of plural colors to form colored pixels on a recording medium to conduct recording,
   wherein with respect to at least one color of the plural colors, an ink-jet recording head for ejecting a thick pigment ink containing a pigment at a relatively high concentration and an ink-jet recording head for ejecting a thin pigment ink containing the pigment at a relatively low concentration are provided, and the average particle diameter of pigment particles contained in the thin pigment ink is greater than the average particle diameter of pigment particles contained in the thick pigment ink.

6. The ink-jet recording apparatus according to claim 5, wherein the average particle diameter of the pigment contained in the thin pigment ink is not smaller than 100 nm, but smaller than 500 nm.

7. The ink-jet recording apparatus according to claim 6, wherein the average particle diameter of the pigment contained in the thick pigment ink is not smaller than 50 nm, but smaller than 100 nm.

8. The ink-jet recording apparatus according to claim 5, wherein the ink-jet recording heads are each equipped with a heater for forming bubbles in the inks using thermal energy.

* * * * *